Sept. 29, 1942.  E. G. KESLING  2,297,563
GEAR SHIFTING MECHANISM
Filed March 13, 1939     4 Sheets-Sheet 1
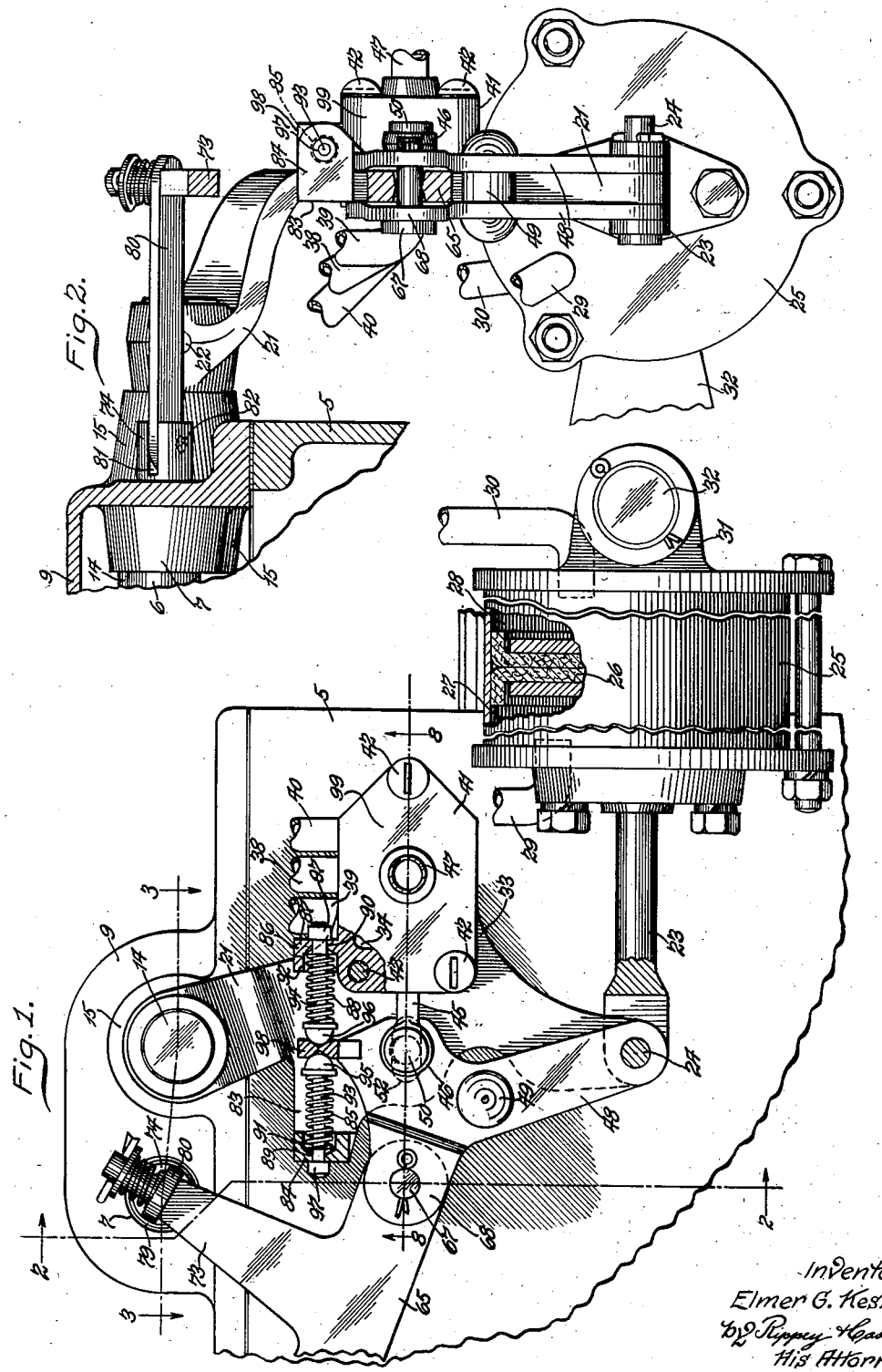
Inventor
Elmer G. Kesling
by Rippey & Cassidy
His Attorneys Sept. 29, 1942.   E. G. KESLING   2,297,563
GEAR SHIFTING MECHANISM
Filed March 13, 1939   4 Sheets-Sheet 2
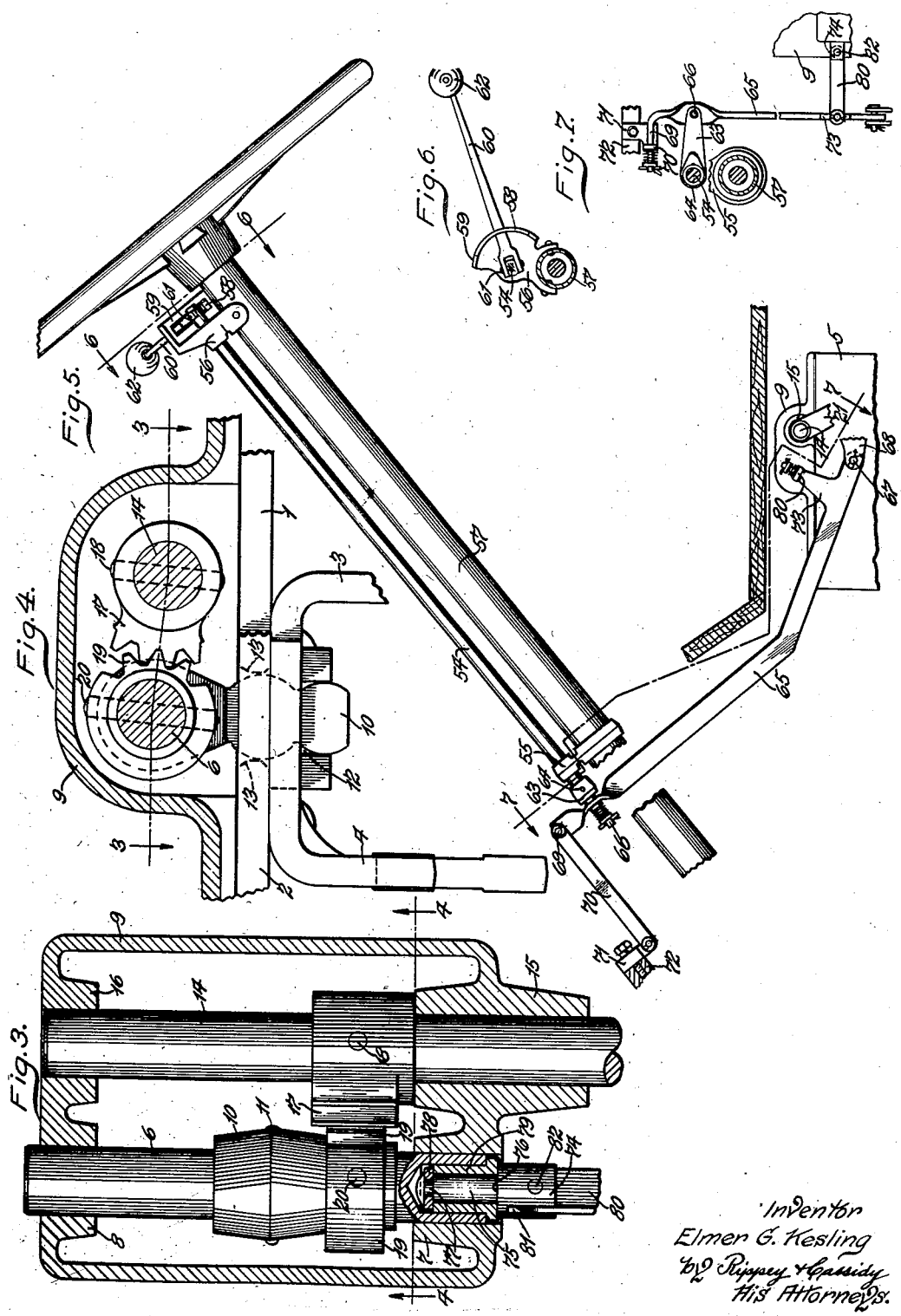
Inventor
Elmer G. Kesling
by Rippey + Cassidy
His Attorneys.

Sept. 29, 1942.  E. G. KESLING  2,297,563
GEAR SHIFTING MECHANISM
Filed March 13, 1939  4 Sheets-Sheet 3
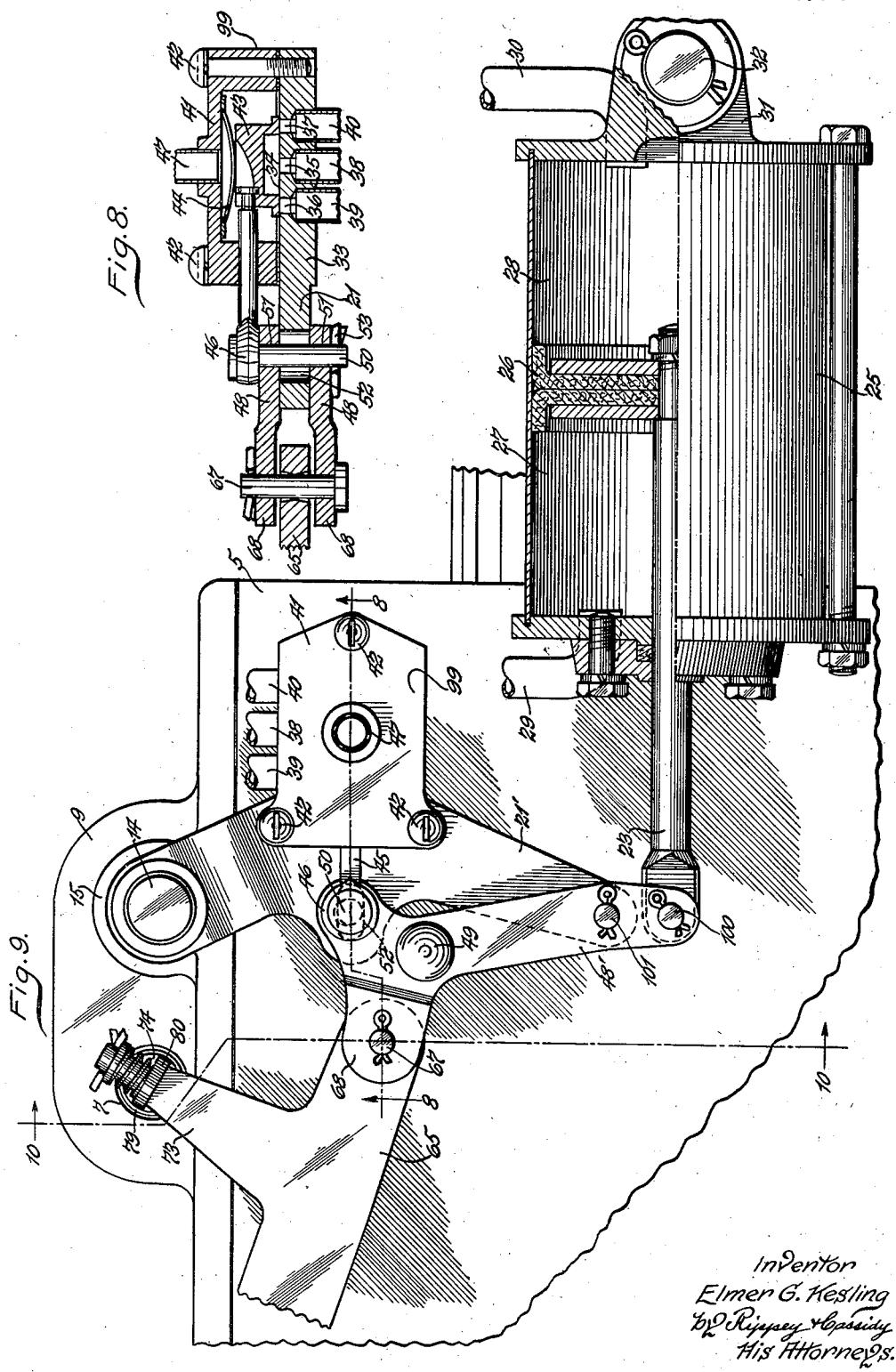
Inventor
Elmer G. Kesling
by Rippey & Cassidy
His Attorneys.

Sept. 29, 1942.   E. G. KESLING   2,297,563
GEAR SHIFTING MECHANISM
Filed March 13, 1939   4 Sheets-Sheet 4
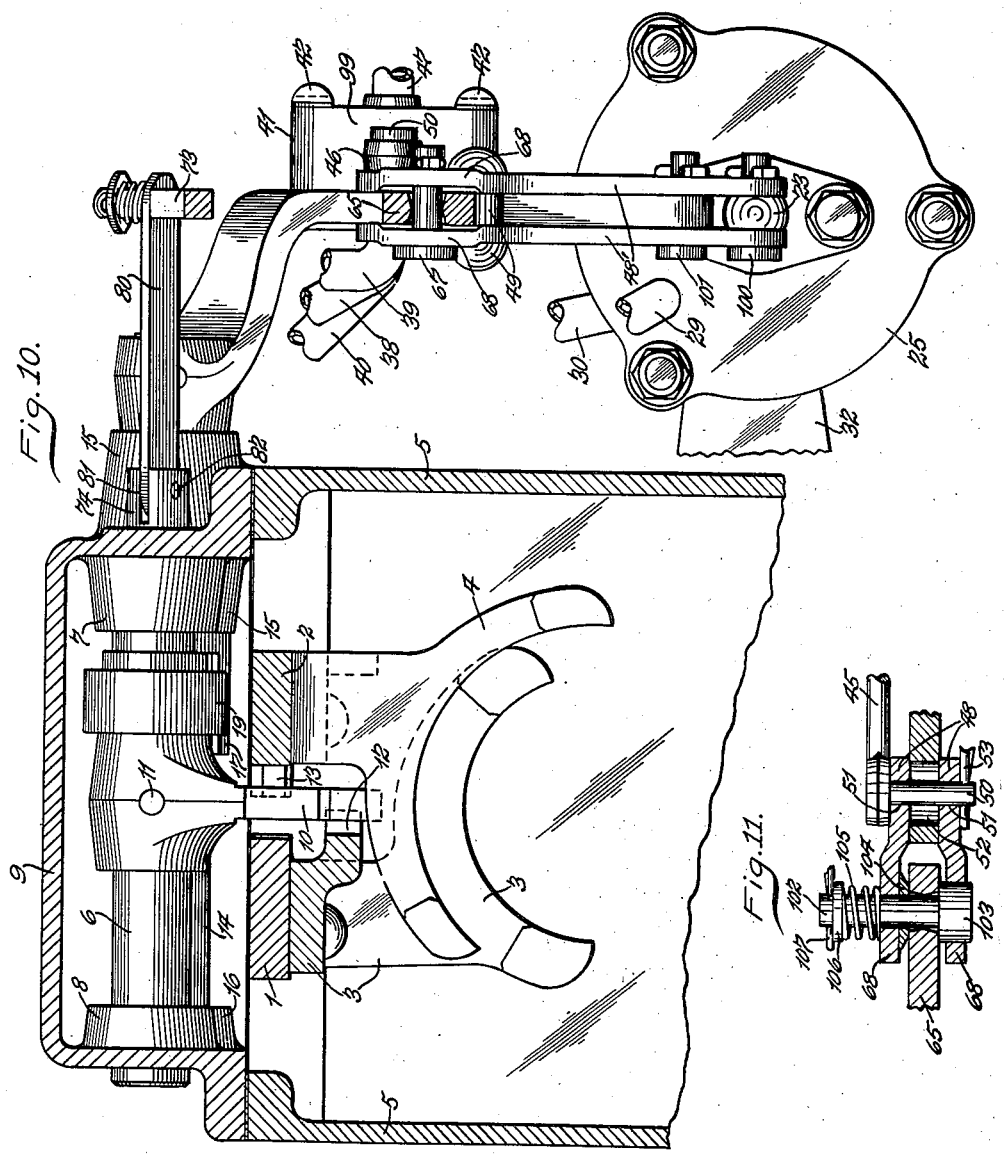
Inventor
Elmer G. Kesling
by Rippey & Cassidy
His Attorneys Patented Sept. 29, 1942

2,297,563

UNITED STATES PATENT OFFICE 2,297,563

GEAR SHIFTING MECHANISM

Elmer G. Kesling, Bloomfield, Mo.

Application March 13, 1939, Serial No. 261,445

22 Claims. (Cl. 74—335)

This invention relates to gear shifting mechanism; and has special utility as a part of the variable speed gearing of automobiles and other vehicles. The gear shifting mechanism used is of the type in which manual energy is applied to effect the selective movements preparatory for the shifting operations; after which manual and power energy may be applied independently or in combination to effect the shifting movements, and in which both manual and power energy is utilized to regulate a power controlling valve mechanism.

The present invention is an improvement in the gear shifting mechanism disclosed in my Patent No. 2,069,526, granted February 2, 1937.

Objects of the invention are to provide mechanism in which power energy normally furnishes the shifting movements; to provide mechanism wherein manual force is normally used to effect selection and initial valve regulation; to provide a construction and arrangement of cooperative parts whereby complete selecting and shifting movements may be manually effected, if desired; to provide a construction wherein manual force may be utilized in any required degree to positively assist the power means to effect the shifting movements; to provide a construction wherein manual force is utilized to initially open the power controlling valve against resilient means and wherein said resilient means will automatically close said valve when said manual force is released; to provide mechanism wherein the power controlling valve is initially opened by manual means and closed by said power means in a follow-up manner; to provide mechanism wherein the controlling valve is normally held closed automatically; to provide mechanism wherein the controlling valve is normally held closed by the power means; to provide mechanism wherein the manual operating means has positive connection with the initial moving portion of the valve mechanism and lost-motion connection with the shifting means or actuator, while the shifting means or actuator is directly attached to both the power means and to the valve seat or follow-up portion of said valve mechanism; and to provide mechanism wherein the valve mechanism, the power means, and the lost-motion connection are mounted at a distance from one another.

Various other objects and advantages of the invention will be made apparent from the following description, reference being made to the annexed drawings, in which—

Fig. 1 is a side elevation partly in section of a part of one form of my improved gear shifting mechanism in connection with the gear case.

Fig. 2 is a front elevation partly in section approximately on the line 2—2 of Fig. 1.

Fig. 3 is a sectional view approximately on the line 3—3 of Fig. 1.

Fig. 4 is a sectional view on the line 4—4 of Fig. 3.

Fig. 5 is a side elevation of a part of my improved gear shifting mechanism showing most of the manual operating parts.

Fig. 6 is a top view of the operating lever and the supporting and guiding bracket shown secured to the steering column which is shown in section on the line 6—6 of Fig. 5.

Fig. 7 is a top view of the actuating link and connections taken partly in section on the line 7—7 of Fig. 5.

Fig. 8 is a sectional view of the valve and its operating connections approximately on the line 8—8 of Fig. 1.

Fig. 9 is a side elevation, similar to Fig. 1, of a modified form of the invention.

Fig. 10 is a sectional view on the line 10—10 of Fig. 9.

Fig. 11 is a modified form of the connections shown in Fig. 8.

Shifter rails 1 and 2 having yokes 3 and 4, respectively, secured thereto are mounted for endwise movements in the top of the gear case 5. The gear case 5 houses the customary gearing (not shown) used in automobile transmissions. The present invention is not concerned with the construction of the gearing that is within the case 5, with the exception that it is understood that longitudinal shifting of the rail 1 and yoke 3 backward and forward will effect reverse and low speed ratios, respectively, and that longitudinal shifting of the rail 2 and yoke 4 backward and forward will effect intermediate and high speed ratios, respectively.

A spindle 6 mounted for longitudinal and turning movements in bearings 7 and 8 in opposite side walls of a case cover 9 has a depending shifting finger 10 (Fig. 4) secured thereto by a pin 11, or otherwise. The finger 10 is selectively engageable with either the notch 12 in the yoke 3, or the notch 13 in the rail 2, by respective longitudinal movements of the spindle 6; and said finger 10 will shift the selected rail and yoke in either direction by respective rocking movements of the spindle 6. The longitudinal movements of the spindle 6 are limited by the depth of the respective notches 12 and 13.

An actuator shaft 14 is mounted for rocking movements only in bearings 15 and 16 in opposite side walls of the case cover 9, and has a gear segment 17 secured thereto by a pin 18, or otherwise. The gear segment 17 meshes with a gear segment 19 secured to the spindle 6 by a pin 20, or otherwise. The gear 17 is made with a wider face than that of the gear 19 in order to give full face mesh to the gear 19 in any longitudinal position of the spindle 6. Turning movements of the shaft 14 turns the spindle 6 through the action of the gear segments 19 and 17.

The shaft 14 extends through the bearing 15 and has a crank arm 21 secured thereto by a pin 22, or otherwise secured. A connecting rod 23 has one end secured by a pin 24 to the lower end of the crank arm 21, while the other end of the rod 23 extends into a cylinder 25 and is secured in any known manner to a piston 26 which divides the cylinder 25 into a front chamber 27 and a rear chamber 28. A tube 29 opens into the chamber 27, while a tube 30 opens into the chamber 28. A projection 31 from the rear wall of the cylinder 25 affords a pivotal bearing on a bracket 32, which may be secured to a convenient stationary part (not shown) of the automobile. A projection 33 from the crank arm 21 forms a valve seat 34 (Fig. 8) which has a passage 35 and ports 36 and 37 therein. Tubes 38, 39 and 40 are secured to the projection 33 and communicate with the passage 35 and ports 36 and 37, respectively.

A cover 41 secured to the projection 33 by screws 42 houses a slide valve 43 which is resiliently held in place by a spring 44 and which is pivotally connected to one end of a rod 45 which extends through a bearing hole in the front wall of the cover 41. An eye 46 is formed on the extended end of the rod 45. A tube 47 communicates with the inside of the cover 41. A swinging connecter 48 has pivotal bearing on the pin 24. It is to be understood that the pivotal bearing of the connecter 48 could be located at another point on the arm 21 away from the pin 24, just so it is kept in the right location with respect to the spindle 14 and the valve 43. For convenience of connection and practical operation, the connecter 48 is constructed of two parts held in positive spaced relation by a spacer 49 (Fig. 2) which is rigidly secured to the connecter by riveting or otherwise. The crank arm 21 extends between the spaced parts of the connecter 48, and the parts 21 and 48 are so formed that the required relative swinging movements of the connecter 48 will not be interfered with by the spacer 49. The connecter 48 projects rearwardly and upwardly and a pin 50 projects through alined holes in the eye 46, holes 51 in the connecter 48, and a slot 52 in the crank arm 21, and is secured therein by a cotter pin 53, or otherwise. The slot 52 is of such length to allow sufficient movement of the slide valve 43 in either direction to completely open the ports 36 and 37. Other functions of the slot 52 will be noted hereafter.

A shaft 54 is mounted for longitudinal and turning movements in brackets 55 and 56 which are secured to the steering column 57 in any known manner (Fig. 5). A slot 58 is formed in an upstanding wall 59 integral with the bracket 56. An operating lever 60 extends through the slot 58 and is pivotally secured to the upper end of the shaft 54 with a pin 61. A hand-hold 62 is secured to the free end of the lever 60. The walls of the slot 58 function as fulcrums and guides for the lever 60. A crank arm 63 is secured by a pin 64 or otherwise to the lower end of the shaft 54.

An actuating link 65 is pivotally connected near one end to a crank pin 66 rigid with the crank arm 63, and the other end of the link 65 is pivotally connected by a pin 67 between projections 68 from the upper portion of the connecter 48. The projections 68 of the connecter 48 are bent away from each other and the hole in that end of the link 65 is slightly tapered at both ends, in order to give space play for oscillating movements of said link 65 (Figs. 2 and 8). The link 65 is thus mounted for both oscillating and longitudinal movements.

At or near the connection to the crank pin 66, the link 65 has a lateral projection 69 which is formed by simply bending the end of the link 65 to the left (Fig. 7). A swinging support 70 is pivotally connected at one end to the free end of the projection 69, and at the other end to a bracket 71 which is secured to some stationary part 72 of the automobile.

This support 70 will cause the link 65 to oscillate or twist when the shaft 54 and crank arm 63 are moved longitudinally, but will swing on its connection and not interfere with longitudinal movements of the link 65 when the shaft 54 and crank arm 63 are turned.

At or near the connection with the projection 68 (Fig. 5), the link 65 has a substantially upstanding projection 73. A connector 74 has a reduced portion 75 which forms a shoulder 76 and a second reduced portion 77 on which a washer 78 is secured. In assembling, a sleeve 79 is mounted on the reduced portion 75 for free rotation between the shoulder 76 and the adjacent side of the washer 78. The sleeve 79 is rigidly secured into an axial hole in the end of the spindle 6 in and adjacent the bearing 7 by heat shrinking or otherwise. Thus assembled the connector 74 extends from the end of the spindle 6 and is preferably made of less diameter than the spindle 6 for free movement into the outer end of the bearing 7 when the spindle 6 is moved longitudinally.

A link 80 is pivotally connected at one end to the free end of the projection 73, and at the other end to the connector 74 by a slot 81 and pin 82.

It will be noted that the construction and arrangement of the parts 74 to 82, inclusive, forms a swivel connection between the spindle 6 and the link 80. It is also to be noted that the link 80 is substantially at right angles to the support 70, and that the stationary support upon which the rear end of the link 65 oscillates is the projection 68 of the connecter 48; and, since the connecter 48 is held against lateral movement by the crank arm 21 and spindle 14, an oscillation of the link 65 will move the spindle 6 longitudinally through the action of the projection 73, link 80, connecter 74, etc.

A projection 83 from the crank arm 21 has the end portion bent at an angle to form a support and abutment 84 for the outer end of a spring 85 (Fig. 1). A projection 86 from the cover 41 forms a support and abutment 87 for the outer end of a spring 88. The abutments 84 and 87 are positioned in spaced relation so that centrally drilled respective holes 89 and 90 are axially alined. The inner ends of the holes 89 and 90 are countersunk to form seats 91 and 92 for the respective springs 85 and 88 which are mounted on respective rods 93 and 94, which have respective enlargements 95 and 96 on one end forming abutments for the inner ends of the respective springs 85 and 88. The other ends of the rods 93 and 94 are extended through the holes 89 and 90, respectively, and holding members 97 are secured to the projecting ends of the rods 93 and 94 by welding or otherwise. The springs 85 and 88 are thus normally held under a definite compression.

The enlargements 95 and 96 are formed with adjacent rounded surfaces which normally repose under little or no pressure in respective recesses formed in the opposite sides of a block 98 which is rigid or integral with the upper end of one of the parts of the connector 48. It is to be noted that the abutments 84 and 87, and the valve seat 34 are rigidly secured to the crank arm 21 and, therefore, will always be in the same relative relation with the crank arm 21, regardless of the position of said arm 21. It then is obvious that, since the connecter 48 is pivotally connected to the crank arm 48 by the pin 24 and held in a normal central relative relation by the springs 85 and 88, and the slide valve 43 is positively connected to the connecter 48, the valve 43 will normally automatically keep the ports 36 and 37 closed.

It is now apparent that any swinging movement of the connecter 48 on the pivotal pin 24 from the normal central relative relation will be against the resilient action of the spring 85 or 88; and that, as the force swinging the connecter 48 is released, the compressed spring 85 or 88, as the case may be, will automatically return the connecter 48 to its normal relation.

It can here be noted also that, since the manually effected valve opening movement is always against the resilient action of either the spring 85 or the spring 88, and thus against the crank arm 21 in the same direction for effecting the required selected shift, the manual force applied to keep the valve open is also being utilized to assist in the shifting movement.

The parts 33, 34, and 41 to 46, inclusive, constitute the valve mechanism, designated as a whole by 99.

It will be understood that rubber tubing or other flexible means (not shown) is to be used to transmit the fluid energy employed to and from the valve mechanism 99 and cylinder 25 of the power device. If vacuum air is to be used, such flexible means would connect the tube 38 to the engine intake manifold (not shown), the tube 39 to the tube 29, and the tube 40 to the tube 30. The tube 47 would simply open to the atmosphere. If a pressure medium were to be used, such flexible means would connect the tube 47 to a pressure device (not shown), and the tube 38 would open to the atmosphere. This connecting means must be flexible because some of the connections are to the valve mechanism 99, which is secured to the crank arm 21, and moves therewith.

In the construction of the modification shown in Figs. 9 and 10, the parts 84 to 98, inclusive, are omitted, and the piston rod 23 is engaged between the two side parts of the connecter 48' and pivotally connected thereto by a pin 100, while the lower end of the crank arm 21' is placed between the side parts of the connecter 48' and pivotally secured by a pin 101. All other parts are the same as shown in Figs. 1 to 8.

In the modified connection shown in Fig. 11, the pin 102 takes the place of the pin 67 and has a head 103 which has bearing in an enlarged hole in one side part of the projection 68. The head 103 abuts against the link 65 while the pin 102 passes through a hole in the end of the link 65, through a washer 104 mounted on said pin 102 between the link 65 and the other side of the projection 68, and through that side of the projection 68, and has a spring 105 which is held compressed by a washer 106 and a cotter pin 107. This construction provides an antirattler connection for the link 65 and the projection 68.

In the operation of the device, if it is desired to selectively shift into either reverse or low speed, the lever 60 is operated to move the shaft 54 downwardly, which will oscillate the link 65 and move the finger 10 longitudinally in the direction to cause the finger 10 to engage only in the notch 12; whereupon, if the shift to effect reverse speed is desired, the lever 60 is swung forward, which causes the shaft 54 and crank arm 63 to turn in the same direction, which causes a forward longitudinal movement of the link 65, and a forward swinging action of the connector 48 against the resilient action of the spring 85. This movement of the connector 48 causes the rod 45 and slide valve 43 to move in the same direction to open the ports 36 and 37; whereupon, if vacuum energy is used, the air will be depleted from the chamber 27 through the tube 38, passage 35, port 36, and tube 39—29; and thereupon atmospheric air will rush through the tube 47, port 37, and tube 40—30 into chamber 28 and move the piston 26 toward the front of the cylinder 25, and swing the crank arm 21 forwardly, causing the shaft 14 and gear segment 17 to turn in the same direction, whereby the meshing gear segments 17 and 19 turn the spindle 6 in the opposite direction and swing the finger 10 to the rear; and, since the finger has been selectively engaged in the notch 12, the rail 1 and yoke 3 will be moved in the same direction and effect the shift into reverse speed position.

It is to be noted that this shifting action has been effected by the power means 26 in a follow-up manner, since manual means 60, etc. has initially moved the valve 43 ahead while the power means has subsequently moved the valve seat 34 in a follow-up manner.

Therefore, it is obvious that this shifting movement continues as the operator continues to move the lever 60, etc. and keeps the valve 43 ahead of the ports 36 and 37, and the acting power means 26 will continue to move the valve seat 34 in the same direction; but, if the operator stops the valve opening movement, the acting power means 26 will follow to move the valve seat 34 and cause the ports 36 and 37 to overrun the valve 43, whereupon said ports are closed and the action of the power means will also stop.

To bring the parts from reverse speed position to neutral position, the parts all act in the opposite direction to that of shifting into reverse speed position; and the valve 43 moving in the opposite direction opens the ports 36 and 37, whereupon the air in the chamber 28 is depleted by said vacuum through the tube 38, passage 35, port 37 and tube 40—30, and atmospheric air rushes through the tube 47, port 36, and tube 39—29, into chamber 27 to move the piston 26 toward the front of the cylinder 25. The connected parts, acting in the said opposite direction, effect the shift into neutral position.

The action of shifting from neutral position to low speed position is the same as shifting from reverse speed position to neutral position; and the action of returning the parts to neutral position from low speed position is the same as shifting from neutral position to reverse speed position.

To shift into either second or high speed position, the action of the lever 60 and parts operated thereby to effect selection are in directions opposite to that for making the described selection for shifting into reverse or low speed position, and the finger 10 is engaged selectively in the notch 13; whereupon, to effect shift to second speed position, the lever 60 is swung forward and the action of all parts is the same as for shifting into reverse speed position, except the finger 10 having been selectively engaged in the notch 13 moves the rail 2 and yoke 4 to the rear to effect the shift into second speed position.

To bring the parts to neutral position and to high speed position, all parts are moved in the opposite direction to that of effecting the shift into second speed position; and the action to bring the parts to neutral position from high speed position is the same as that to effect shift into second speed position.

It is intended that the customary interlock and spring plungers (not shown) are to be used respectively, to prevent simultaneous shifting of both rails 1 and 2, and to hold said rails yieldingly in shifted positions. If the power energy is not sufficient to effect the shift, or if no power energy is available, manual force may be utilized to assist or to completely effect the shifting movements, respectively.

Selection is always effected manually in the manner described, regardless of whether the shifting movements are to be effected by power means alone, by a combination of power and manual means, or by manual means alone. Manual action to shift or assist shifting is effected by the pin 50 engaging either the front or the rear end, as the case may be, of the slot 52; whereupon a continued movement of the parts 48, 65, 63, 54, etc., in the same direction will swing the crank arm 21 and turn the shaft 14 and gear 17 in the same direction and cause the gear 19 and spindle 6 to turn and the finger 10 to swing in the opposite directions to effect the shift selected as disclosed in describing the power shifting movements.

The selecting and shifting operations of the modification shown in Figs. 9 and 10 are accomplished in the same manner, except as to the action of the connecter 48', which functions as a connector and equalizer; and, since the connecter 48' is an equalizer of the forces between the manual means and the power means in effecting the shifting movements, it becomes a part of the actuator. The equalizing action is to the effect that the force required by manual means and the power means is in indirect proportion to the length of the respective ends of the equalizer, because the manual means will furnish a definitely smaller proportion of the force required to effect the shifting movements, while the power means will furnish the remaining definitely larger proportion of the forces required to effect the shifting movements. An exception to this proportion of forces will occur when the pin 50 engages one or the other end of the slot 52, and the manual force applied will further assist the power means to effect the shifting movements; and this amount of assistance will increase in indirect proportion to the efficiency of the power means, to the end that if the power means should completely fail the manual means will effect the entire shifting movement.

In the operation of this modification, the manual means 65, etc. initially opens the valve 43 and the power means 26, etc. finally closes the valve; this valve closing may be accomplished in either one of two ways: first, by the valve element 43 being held stationary by the manual means while the power means moves the valve element 33 to overrun the valve element 43 in a follow-up manner; or, second, by the power means moving the valve 43 in a return direction through the action of the equalizer 48' pivoting on the pin 101. Therefore, the manual means acts to initially regulate the valve and also to initially move a part of the actuator, and the power means subsequently assists the manual means to effect the movement of the actuator and also to subsequently close the valve in a follow-up manner.

It must now be apparent that my invention obtains all the intended objects in a highly efficient manner. Obviously, the construction, arrangement, and relationship of the parts may be varied within the scope of equivalent limits without departure from the nature and principle of the invention. I do not restrict myself specifically otherwise than as set forth in the appended claims, nor do I restrict myself unessentially in any respects.

I claim:

1. Gear shifting mechanism of the character described comprising selective shifter elements, a spindle mounted for longitudinal and turning movements for selectively shifting said elements, an actuating shaft mounted for turning movements only, gearing for turning said spindle by said actuator shaft, an operating shaft supported for longitudinal and turning movements, crank arms attached to said shafts respectively, a pivotal support, a link member connected with said support and said crank arms for oscillating and longitudinal movements, and a lateral projection from said link member connected with said spindle and leaving said link free for oscillating and longitudinal movements to move said spindle longitudinally and to turn said actuator shaft when said link member is oscillated and moved longitudinally as aforesaid.

2. Gear shifting mechanism of the character described comprising selective shifter elements, a spindle supported for longitudinal movements for selectively engaging said shifter elements and for turning movements for shifting said elements, an actuating shaft supported for turning movements only, gearing for turning said spindle by said actuator shaft, an operating shaft supported for longitudinal and turning movements, crank arms attached to said shafts respectively, a link member connected with said crank arms for oscillating and longitudinal movements, means for oscillating said link member by longitudinal movements of said operating shaft, and a lateral projection from said link member pivotally connected with said spindle for moving said spindle longitudinally when said link member is oscillated as aforesaid and for turning said actuator shaft when said link member is moved longitudinally.

3. Gear shifting mechanism of the character described comprising selective shifter elements, a spindle supported for longitudinal movements for selectively engaging said elements and for turning movements for shifting said elements, an operating shaft supported for longitudinal and turning movements, a link member connected with said operating shaft for oscillating and longitudinal movements thereby, means for oscillating said link member by longitudinal movements of said operating shaft, gearing for turning said spindle, and connections for operating said gearing by longitudinal movements of said link member to impart turning movements to said spindle and thereby operate the engaged shifter element.

4. Gear shifting mechanism of the character described comprising selective shifter elements, a spindle supported for longitudinal movements to engage said shifter elements selectively and for turning movements to shift the engaged shifter elements, an actuating shaft for turning said spindle, an operating shaft supported for longitudinal and turning movements, power mechanism for turning said actuating shaft and thereby said spindle to shift the selectively engaged shifter elements, a link for moving said spindle longitudinally and for controlling said power mechanism for operation, and connections operated by longitudinal movements of said operating shaft for oscillating said link and thereby moving said spindle longitudinally into selective engagement with said shifter elements respectively and by turning movements of said operating shaft for moving said link longitudinally to control said power mechanism for operation.

5. Gear shifting mechanism of the character described comprising selective shifter elements, a spindle supported for longitudinal movements to engage said shifter elements selectively and for turning movements to shift the engaged shifter elements, an operating shaft supported for longitudinal and turning movements, power mechanism for turning said spindle to shift the selectively engaged shifter elements, a link for moving said spindle longitudinally and also for controlling said power mechanism for operation, connections operated by longitudinal movements of said operating shaft for oscillating said link and thereby moving said spindle longitudinally into selective engagement with said shifter elements and for moving said link longitudinally by turning movements of said operating shaft to control said power mechanism for operation, and gear mechanism operated by said power mechanism for turning said spindle as aforesaid.

6. Gear shifting mechanism of the character described comprising selective shifter elements, a spindle supported for longitudinal movements to engage said shifter elements selectively and for turning movements to shift the engaged shifter elements, power mechanism for turning said spindle to shift the selectively engaged shifter elements, an operating shaft supported for longitudinal and turning movements, a link connected with said spindle and said power mechanism, and connections for operating said link by longitudinal movements of said operating shaft to move said spindle longitudinally into engagement with a selected shifter element and also for operating said link by turning movements of said shaft to control said power mechanism for operation after said spindle has been engaged with a selected shifter element.

7. Gear shifting mechanism of the character described comprising selective shifter elements, a spindle supported for longitudinal movements to engage said shifter elements selectively and for turning movements to shift the respectively engaged shifter elements, power mechanism for turning said spindle, an operating shaft supported for longitudinal and turning movements, a link connected with said operating shaft and with said spindle for moving said spindle longitudinally by longitudinal movements of said operating shaft, a connection from said link for controlling said power mechanism for operation by longitudinal movement of said link, and a device for moving said shaft longitudinally to cause said link to move said spindle longitudinally and for turning said shaft to control said power mechanism for operation.

8. Gear shifting mechanism of the character described comprising selective shifter elements, a spindle supported for longitudinal movements to engage said shifter elements selectively and for turning movements to shift the engaged shifter elements, power mechanism for turning said spindle, an operating shaft supported for longitudinal and turning movements, a link connected to said spindle and to said power mechanism, a lever attached to said operating shaft for imparting longitudinal and turning movements thereto, a fulcrum cooperating with said lever to cause said lever to move said shaft longitudinally and leaving said lever free to turn said shaft, and connections from said shaft to said link for oscillating said link and moving said spindle longitudinally by longitudinal movements of said shaft and for moving said link longitudinally to control said power mechanism for operation by turning movements of said shaft.

9. Gear shifting mechanism of the character described comprising selective shifter elements, a spindle supported for longitudinal movements to engage said elements selectively and for turning movements to shift the engaged shifter elements, power mechanism operatively connected with said spindle for turning the same, an operating shaft supported for longitudinal and turning movements, a lever for moving said shaft longitudinally and thereafter turning the same, a link connected with said spindle and with said power mechanism, and connections operated by longitudinal movements of said shaft for operating said link to move said spindle longitudinally and operated by turning movements of said shaft for moving said link longitudinally to control said power mechanism.

10. Gear shifting mechanism of the character described comprising selective shifter elements, a spindle supported for longitudinal movements to engage said shifter elements selectively and for turning movements to shift the engaged shifter elements, a power device operatively connected with said spindle for turning the same, a valve controlling said power device, an operating shaft supported for longitudinal and turning movements, a link connected with said spindle for moving the same longitudinally and with said valve, a lever for moving said operating shaft longitudinally and thereafter turning the same, and connections from said shaft for operating said link to move said spindle longitudinally and also to control said valve for operation of said power device.

11. Gear shifting mechanism of the character described comprising selective shifter elements, a spindle supported for longitudinal movements for selectively engaging said elements and for turning movements for shifting said elements, power mechanism for turning said spindle after said spindle has been selectively engaged with any one of said elements, a link connected with said spindle and with said power mechanism for moving said spindle longitudinally and thereafter controlling said power mechanism for operation, and a shaft connected with said link.

12. Gear shifting mechanism of the character described comprising selective shifter elements, a spindle supported for longitudinal movements for selectively engaging said elements and for turning movements for shifting said elements, power mechanism for turning said spindle after said spindle has been selectively engaged with any one of said elements, a link pivotally connected with said spindle and also with said power mechanism for moving said spindle longitudinally and thereafter controlling said power mechanism for operation, and means pivotally connected with said link for operating said link.

13. Gear shifting mechanism of the character described comprising selective shifter elements, a spindle supported for longitudinal movements to engage said elements selectively and for turning movements to shift the engaged shifter elements, power mechanism, connections operated by said power mechanism for turning said spindle, and a link pivotally connected with said spindle and also with said connections for moving said spindle longitudinally into engagement with any selected one of said shifter elements and thereafter controlling said power mechanism for operation to rotate said spindle.

14. Gear shifting mechanism of the character described comprising selective shifter elements, a spindle supported for longitudinal movements for selectively engaging said elements and for turning movements for shifting the selectively engaged elements, connections for turning said spindle, power mechanism for operating said connections, a valve entirely supported by said connections controlling energization of said power mechanism, and a link having pivotal connection with said spindle and also with said valve for moving said spindle longitudinally into engagement with any selected one of said elements and thereafter regulating said valve to cause energization of said power mechanism for operating said connections to turn said spindle.

15. Gear shifting mechanism of the character described comprising selective shifter elements, a spindle supported for longitudinal movements into and out of selective engagement with any one of said elements and for turning movements for shifting the engaged elements, connections for turning said spindle after selective longitudinal movement thereof, power mechanism for operating said connections to turn said spindle, a valve entirely supported by said connections controlling said power mechanism, and a link having pivotal connection with said spindle and also with said valve for moving said spindle longitudinally and thereafter regulating said valve for energization of said power mechanism and also assisting said power mechanism in operating said connections to turn said spindle.

16. Gear shifting mechanism of the character described comprising selective shifter elements, a spindle supported for longitudinal movements into and out of selective engagement with any one of said elements and for turning movements for shifting the engaged elements, connections for turning said spindle after selective longitudinal movement thereof, power mechanism for operating said connections to turn said spindle, a valve entirely supported by said connections controlling energization of said power mechanism, and a link having pivotal connection with said spindle and also with said valve for moving said spindle longitudinally and thereafter regulating said valve for energization of said power mechanism and also assisting said power mechanism in operating said connections to turn said spindle or to effect complete turning movement of said spindle when said power mechanism becomes ineffective.

17. Gear shifting mechanism of the character described comprising selective shifter elements, a spindle for selectively engaging and shifting said elements, power mechanism, connections from said power mechanism including a crank arm and gearing for turning said spindle to shift the selectively engaged shifter elements, a valve entirely supported by said crank arm controlling energization of said power mechanism, and manual means for selectively engaging said spindle with any one of said shifter elements and thereafter opening said valve to cause energization of said power mechanism and thereby operation of said connections to turn said spindle.

18. Gear shifting mechanism of the character described comprising selective shifter elements, a spindle for selectively engaging and shifting said elements, powder mechanism, connections from said power mechanism including a crank arm and gearing for turning said spindle to shift the selectively engaged shifter elements, a valve entirely supported by said crank arm controlling energization of said power mechanism, and manual means for selectively engaging said spindle with any one of said shifter elements and thereafter opening said valve to cause energization of said power mechanism and thereby operation of said connections to turn said spindle and also for assisting operation of said connections by said power mechanism or for effecting complete operation thereof when said power mechanism is inoperative.

19. Gear shifting mechanism of the character described comprising selective shifter elements, a device for selectively engaging and shifting said elements, power mechanism, connections from said power mechanism including a crank arm for turning said device to shift the selectively engaged shifter elements, a valve wholly supported by said crank arm for controling and preventing energization of said power mechanism until said device has been selectively engaged with one of said shifter elements, manually operative means for selectively engaging said device with one of said shifter elements and thereafter opening said valve to cause energization of said power mechanism and thereby operation of said connections to turn said device, and other means supported by said connections for closing said valve.

20. Gear shifting mechanism of the character described comprising selective shifter elements, a spindle for selectively engaging and shifting said elements, power mechanism, a crank connected with said power mechanism, connections operated by said crank for turning said spindle, a valve supported by said crank controlling and preventing energization of said power mechanism until after said spindle has been selectively engaged with one of said shifter elements, manual means for selectively engaging said spindle with any one of said shifter elements and thereafter opening said valve to cause operation of said power mechanism and thereby energization of said crank, and resilient means supported by said crank for closing said valve when said manual means is released.

21. Gear shifting mechanism of the character described comprising an actuator including a crank arm, a power device for moving said crank arm as described, valve means including a valve seat and a valve plate wholly supported by said crank arm for controlling energization of said power device, said valve seat rigidly supported by said crank arm and movable therewith, said valve plate mounted on said valve seat for relative movement thereto to open and close said valve means to control energization of said power device, manual operating means for moving said valve plate to open said valve means, and other means for moving said valve plate to close said valve means when and as said manual operating means is released.

22. Gear shifting mechanism of the character described comprising an actuator including a crank arm, a power device for moving said crank arm as described, valve means including a valve seat and a valve plate wholly supported by said crank arm for controlling energization of said power device, said valve seat rigidly supported by said crank arm and movable therewith, said valve plate mounted on said valve seat for relative movement thereto to open and close said valve means to control energization of said power device, manual operating means for moving said valve plate to open said valve means, and resilient means for moving said valve plate to close said valve means when and as said manual operating means is released.

ELMER G. KESLING.